United States Patent
Hwang et al.

(10) Patent No.: US 9,190,688 B2
(45) Date of Patent: Nov. 17, 2015

(54) TREATMENT METHOD FOR SOLID OXIDE FUEL CELLS AND APPARATUS THEREOF

(71) Applicant: INSTITUTE OF NUCLEAR ENERGY RESEARCH ATOMIC ENERGY COUNCIL, EXECUTIVE YUAN, Taoyuan County (TW)

(72) Inventors: Chang-Sing Hwang, Taoyuan County (TW); Chun-Liang Chang, Taoyuan County (TW); Chun-Huang Tsai, Taoyuan County (TW); Sheng-Huei Nian, Taoyuan County (TW); Chih-Ming Chuang, Taoyuan County (TW); Shih-Wei Cheng, Taoyuan County (TW)

(73) Assignee: INSTITUTE OF NUCLEAR ENERGY RESEARCH ATOMIC ENERGY COUNCIL, EXECUTIVE YUAN, Taoyuan County (TW)

( * ) Notice: Subject to any disclaimer, the term of this patent is extended or adjusted under 35 U.S.C. 154(b) by 178 days.

(21) Appl. No.: 13/845,647

(22) Filed: Mar. 18, 2013

(65) Prior Publication Data

US 2014/0113216 A1   Apr. 24, 2014

(30) Foreign Application Priority Data

Oct. 19, 2012   (TW) .............................. 101138649 A

(51) Int. Cl.
| | |
|---|---|
| B29C 43/02 | (2006.01) |
| H01M 8/12 | (2006.01) |
| H01M 4/88 | (2006.01) |
| H01M 8/02 | (2006.01) |
| H01M 8/04 | (2006.01) |

(52) U.S. Cl.
CPC .......... *H01M 8/1246* (2013.01); *H01M 8/1226* (2013.01); *H01M 4/8889* (2013.01); *H01M 8/0297* (2013.01); *H01M 8/04223* (2013.01); *H01M 2008/1293* (2013.01); *Y02E 60/522* (2013.01); *Y02E 60/525* (2013.01)

(58) Field of Classification Search
CPC ............ H01M 8/1246; H01M 8/1226; H01M 8/04223; H01M 8/0297; B30B 1/001; B30B 15/0052; B30B 15/065; B30B 15/16; B30B 15/22; B30B 15/26
USPC .......................... 425/78, 174.6, 504, 352–355
See application file for complete search history.

(56) References Cited

U.S. PATENT DOCUMENTS

| | | | |
|---|---|---|---|
| 2,755,532 A * | 7/1956 | Ceramique Moderne-Marseill Le et al. ......................... 241/199.11 | |
| 3,392,429 A * | 7/1968 | House ........................... 425/298 | |
| 4,140,453 A * | 2/1979 | John, Jr. ........................ 425/151 | |
| 4,401,614 A * | 8/1983 | DeSantis ....................... 264/109 | |
| 5,323,655 A * | 6/1994 | Eagan et al. ................. 73/432.1 | |
| 6,116,890 A * | 9/2000 | Sors .............................. 425/352 | |
| 7,547,204 B2 * | 6/2009 | Tokita et al. .................... 425/78 | |

* cited by examiner

*Primary Examiner* — Joseph S Del Sole
*Assistant Examiner* — Thukhanh T Nguyen
(74) *Attorney, Agent, or Firm* — WPAT, PC; Justin King

(57) ABSTRACT

A treatment method for solid oxide fuel cells includes: measuring a radius of curvature of a cell; measuring a surface resistance of cathode current collecting layer of a cell; performing an alcohol permeating test of a cell; performing simultaneously several stages of compression and heating or cooling to a cell; an apparatus for completing above stages is also disclosed.

13 Claims, 4 Drawing Sheets

TREATMENT METHOD FOR SOLID OXIDE FUEL CELLS AND APPARATUS THEREOF

FIELD OF THE INVENTION

The present invention relates to a method and apparatus for treating solid oxide fuel cells (SOFCs), and more particularly, to a hot press treatment method and apparatus designed for improving the performance of solid oxide fuel cells (SOFCs).

BACKGROUND OF THE INVENTION

In recent years, with the raising awareness of environmental protection, almost every country in the world has invested in the development of alternative energy sources, and among those efforts, one alternative energy source that had been commonly agreed to be the most promising is solid oxide fuel cells.

The solid oxide fuel cell (SOFC) is an electrochemical conversion device that produces electricity directly from oxidizing a fuel, and in this oxidation reaction, only water as a byproduct is being given off. Thus, this class of fuel cells is characterized in that: high efficiency and low emissions.

SOFCs can be divided into two types of SOFCs depending on their geometry designs, which are the planar type and the tubular type. Generally, The power performance of the planar SOFCs is currently better than the power performance of the tubular SOFCs. However, all the SOFCs in various designs should share the advantages of high efficiency, long-term stability, and relatively low cost.

There are numerous reports and patents for various SOFC constitutions had been provided, whereas a common SOFC is composed of electrolytes, anodes and cathodes. Generally, the electrolyte is made of yttria-stabilized zirconia (YSZ), the anode is made of a cermet (Ni/YSZ) composed of nickel (Ni) and yttria-stabilized zirconia (YSZ), and the cathode is made of conductive lanthanum strontium-doped manganite (LSM, $LaMnO_3$) with a perovskite structure.

However, since yttria-stabilized zirconia (YSZ) exhibits sufficient ion conductivity only under high temperatures larger than 900° C., and as a consequence, the sealing material and the connection material used in the solid oxide fuel cell (SOFC) must be made of high-cost materials with good high-temperature resistance. Therefore, SOFCs can be too expensive to be used widely.

Nevertheless, there are SOFCs which is designed to operate at a temperature lower than 900° C. by adopting a thinner YSZ electrolyte, but such SOFCs still suffer great energy loss due to resistance. On the other hand, an electrolyte (made of, for example, lanthanum strontium gallate magnesite (LSGM) with high ion conductivity, can be used to manufacture a solid oxide fuel cell that works at intermediate temperatures ranged from 600° C. to 800° C.

Moreover, as the temperature decreases, electrochemical activities at the cathode and anode decrease, causing polarization resistances at the cathode and anode to increase and thus inducing great energy loss.

For the planar SOFCs, they are usually being fabricated with robust supports for supporting the construction of the whole SOFC stack. The most common supports are made of a composite of ceramic and metal, and thus can be referred as cermet (ceramic-metal) supports. However, such cermet supports are disadvantageous in their high cost, difficulty to process, vulnerability to cracking and breakage, low resistance to thermal shocks, and low thermal conductivity.

Therefore, there are more and more metal-supported planar SOFCs to be developed for replacing the traditional cermet-supported planar SOFCs, and the metal-supported planar SOFCs have porous metal substrates to support themselves. There are already many methods being developed for fabricating such metal-supported planar SOFCs, such as strip casting, pulsed laser deposition (PLD), and air plasma spray (APS). Among which, APS is most common method, but it can cause the fuel cell to deform. The reason is: the porous metal substrate and the different layers of a SOFC are generally made of different materials with different thermal expansion coefficients so that they can expand differently while the layers of a SOFC are sequentially coated on the porous metal substrate by the high temperature plasma spraying in the APS process, and thus thermally induced stresses exerted between different layers of a SOFC cause a SOFC to deform as the consequence.

SUMMARY OF THE INVENTION

In view of the disadvantages of prior arts, the primary object of the present invention is to provide a method and apparatus for treating solid oxide fuel cells (SOFCs), and more particularly, to a hot press treatment method and apparatus designed for improving and eliminating the deformation of a metal-supported SOFC while also improving the power performance of solid oxide fuel cell, especially its cathode performance.

To achieve the above object, the present invention provides a method for treating solid oxide fuel cells, which comprises the steps of:
  measuring a radius of curvature of a cell;
  measuring a surface resistance of cathode current collecting layer of the cell;
  performing an alcohol permeating test upon the cell; and
  performing a compression process of multiple compressing stages and a heating process of multiple heating/cooling stages to the cell.

In an embodiment, the present invention provides an apparatus for treating solid oxide fuel cells, which comprises:
  a pressure source;
  a compression system, coupled to the pressure source;
  a heating unit;
  a pressure transmission unit, coupled to the compression system and to transmit a pressure to a SOFC;
  a temperature controller, coupled to the heating unit; and
  a pressure controller, coupled to the compression system.

Accordingly, the method and apparatus for treating solid oxide fuel cells have the following advantage:
  (1) The amount of stress being induced inside the fuel cell is reduced.
  (2) The flatness of the fuel cell is improved.
  (3) The cohesion between layers in the fuel cell is increased.
  (4) The cathode polarization resistance of solid oxide fuel cell as well as the surface resistance of cathode current collecting layer of solid oxide fuel cell are reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
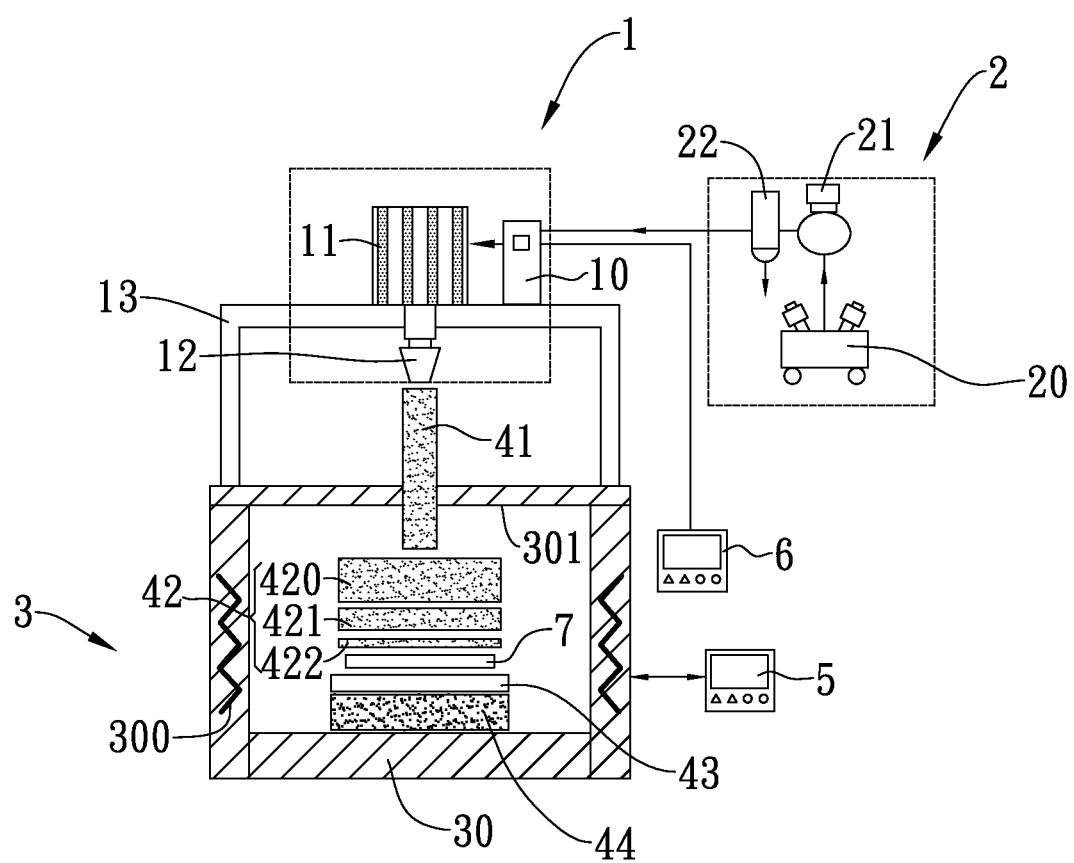
FIG. 1 is a schematic diagram showing an apparatus for treating solid oxide fuel cells according to an exemplary embodiment of the present invention.

Please refer to FIG. 1, which is a schematic diagram showing an apparatus for treating solid oxide fuel cells according to an exemplary embodiment of the present invention. As shown in FIG. 1, the treatment apparatus comprises: a compression system 1, a pressure source 2, a heating unit 3, a pressure transmission unit 4, a temperature controller 5 and a pressure controller 6. Wherein, the compression system is configured with a pressure regulator 10, a pneumatic cylinder 11, a hammer 12 and a support 13 in a manner that the pressure regulator 10 is coupled to the pneumatic cylinder 11, and the hammer 12, being a taper head hammer with maximum output of 250 kg in this embodiment, is also coupled to the pneumatic cylinder 11, while allowing both the pressure regulator 10 and the cylinder 11 to be mounted to the support 13 and the hammer to be arranged movable through the support 13.

Moreover, the pressure source is configured with an air compressor 20, a pressure gauge 21 and a moisture separator 22 in a manner that the moisture separator 22 is coupled to the pressure gauge 21, and the pressure gauge 21 is coupled to the air compressor 20. Thereby, the air compressor 20 is used for providing a pressure, the pressure gauge 21 is used for regulating and displaying the pressure from the air compressor 20, and the moisture separator 22 is used for separating water droplets from air provided from the air compressor 20. In this embodiment, the pressure output from the air compressor 20 is ranged between 4 kg/cm$^2$~8 kg/cm$^2$.

The heating unit 3 includes a furnace 30 which is further configured with a heater 300 and a door 301, and the operating temperature of the furnace 30 in this embodiment is ranged between 800° C. and 1100° C. In addition, the heater 300 is arranged at the sides of the furnace 30 while the door 301, being a flip-up door, is arranged at the top of the furnace 30 and is formed with a hole at the center thereof. The support 13 is arranged to surround the door 301.

The pressure transmission unit 4 is configured with a ceramic tube 41, a cushion module 42, a metal supporting plate 43 and a ceramic supporting brick set 44. The ceramic tube 41 is disposed passing through the hole of the door 301 and extending inside the furnace 30 and is engaged with the hammer 12 so as to be activated by the action of the hammer 12 for transmitting forces from the hammer 12 downwardly. In this embodiment, the ceramic tube 41 is substantially a ceramic aluminum oxide tube. The treated cell 7 is disposed on the metal supporting plate 43.

The metal supporting plate 43 is designed with an expansion coefficient that is about the same as that of the electrolyte of the treated cell 7; and is substantially a Crofer 22 ferritic stainless steel plate in a thickness of 5~6 mm in this embodiment.

In addition, the ceramic supporting brick set 44 is arranged inside the furnace 30 and at the bottom thereof for allowing the cushion module 42, the treated cell 7 and the metal supporting plate 43 to be disposed on the top of the ceramic supporting brick set 44. In this embodiment, the cushion module 42 is composed of a ceramic plate 420, a ceramic blanket 421 and a ceramic cloth 422 that are stacking sequentially on the top of one another. In this embodiment, both the ceramic blanket 421 and the ceramic cloth 422 are made from a material containing more than 50% alumina fiber; and the ceramic plate 420 is substantially a solid aluminum oxide plate that is strong enough to be used in a high temperature environment ranged between 800° C.~1100° C. without deformation. Since the expansion coefficient of the ceramic plate 420 is generally different from that of the electrolyte of the treated cell 7, the ceramic blanket 421 and the ceramic cloth 422 sandwiched between the ceramic plate 420 and the treated cell 7 are applied to reduce the adverse effect caused by the thermal expansion mismatch from ceramic plate 420 and the electrolyte of the cell 7.

Operationally, by the cushion module 42, the metal supporting plate 43 and the ceramic supporting brick set 44, the downward pressure of the ceramic tube 41 can be evenly distributed on the cell 7.

The temperature controller 5 is coupled to the furnace 30 for controlling the heater 300 to heat up the interior of the furnace 30 to a specific temperature, and also the temperature controller 5 is capable of displaying the temperature setting and the actual temperature of the furnace. Similarly, the pressure controller 6 is coupled to the pressure regulator 10 for controlling the pressure exerting on the cell 7, and also is capable of displaying the pressure setting and the actual pressure of the pressure regulator 10. Moreover, the temperature controller 5 and the pressure controller 6 are programmed to perform a multi-stage operation so as to respectively control the pressure from the source 2 and the temperature of the furnace 30 accordingly.

Figure 2:
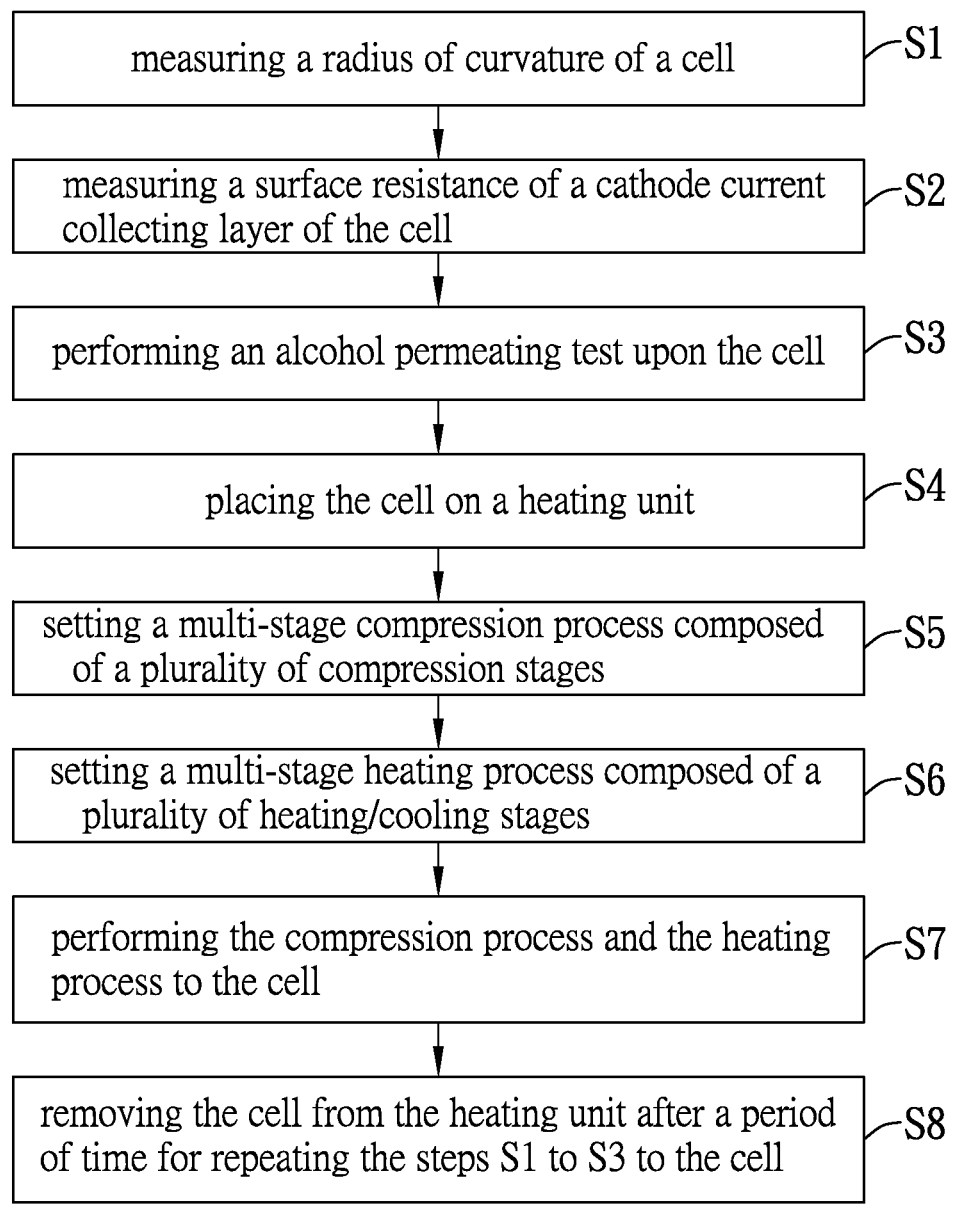
FIG. 2 is a process flow chart depicting steps performed in a method for treating solid oxide fuel cells according to the present invention.

Please refer to FIG. 2, which is a process flow chart depicting steps performed in a method for treating solid oxide fuel cells according to the present invention. As shown in FIG. 2, the treatment method starts from step S1. At step S1, a cell 7 as shown in FIG. 1 is provided for measuring a radius of curvature of the cell 7, whereas the measuring of the radius of curvature of the cell is performed in a manner that, first, a height deformation value of the cell's center with respect to one corner of the cell is measured and obtained, and then the height deformation value is converted into the radius of curvature by a calculation so as to be registered; and then the process flow chart proceeds to step S2. It is noted that the architecture of the cell 7 is known to those skilled in the art and thus will not be described further herein.

At step S2, the surface resistance of a cathode current collecting layer of the cell 7 is measured and registered, whereas the measuring of the surface resistance is performed by applying a multi-meter to the cathode current collecting layer of the cell 7 for surface resistance measurement, while allowing the two measuring contact probes of the multi-meter to be spaced from each other by 2 mm; and then the process flow chart proceeds to step S3.

At step S3, an alcohol permeating test is performed upon the cell 7, whereas the performing of the alcohol permeating test upon the cell 7 further comprises the steps of: spraying liquid alcohol over the porous metal substrate of the cell 7; and then reversing the cell 7, examining the surface of the cathode current collecting layer and determining whether there is no alcohol permeating through the electrolyte of the cell or the amount of alcohol permeating through the electrolyte is negligible; if there is no significant trace of wetness to be found on the surface of the cathode current collecting layer, then the process flow chart proceeds to step S4.

At step S4, as shown in FIG. 1, the metal supporting plate 43 is disposed on the top of the ceramic support brick set 44, and the cell 7 is disposed on the top of the metal supporting plate 43 while allowing the cell 7 to align with the center of the metal supporting plate 43, and having the porous metal substrate of the cell 7 in contact with the metal supporting plate 43. After the cushion module 42 is placed on the top of the cell 7, the door 301 of the furnace 301 is closed, and then the process flow chart proceeds to step S5.

At step S5, a multi-stage compression process composed of a plurality of compression stages is set up; and then the process flow chart proceeds to step S6. Moreover, in an embodiment, during the performing of step S5, the ceramic tube 41 is arranged passing through the hole of the door 301 so as to keep in contact with the top of the ceramic plate 420 of the cushion module 42. Operationally, the pressure controller 6 controls the compression system 1 to set an initial pressure of the pneumatic cylinder 11 to be 150 $g/cm^2$ in this embodiment, and as a consequence, by this initial pressure, the hammer 12 is forced to descend and press on the ceramic tube 41, then the downward pressing force from the ceramic tube 41 presses upon the ceramic plate 420 of the cushion module 4 and is distributed evenly on the cell 7 by the cushion module 42 and the metal supporting plate 43. Moreover, the plural compression stages set up in the step S5 are featured respectively by their distinctive initial loads (or initial pressures), final loads (or final pressures) and load durations. The final load of a previous stage is commonly used as the initial load of the following stage. It is noted that the initial load and the final load of each compression stage can also be adjusted according to actual requirement; and the load duration for each and every compression stage is determined according to the heating rate and heating time of the furnace 30, while the heating rate and heating time of the furnace 30 are controlled by the temperature controller 5.

Taking a cell 7 with an area of 10×10 $cm^2$ as an example, in the first compression stage of the multi-stage operation, a first initial load for the hammer 12 is set to be 15 kg and/or a first initial pressure for the cell 7 is set to be 150 $g/cm^2$, while allowing a first final load to be equal to the first initial load and simultaneously enabling the hammer 12 to press the cell 7 at the first initial load for a first load duration of about 65 min.

The second compression stage of the multi-stage operation starts right after the completion of the first load duration and will last as long as a second load duration. In the second compression stage, the output load of the hammer 12 is varied from a second initial load, that is equal to the first final load, to a second final load. In this embodiment, the second load duration is set to be 7 minutes, and the second final load is set to be 80 kg, which implies that the second final pressure on the cell 7 is 800 $g/cm^2$.

The third compression stage of the multi-stage operation starts right after the completion of the second load duration and will last as long as a third load duration. In the third compression stage, the output load of the hammer 12 is maintained at the second final load for a period of the third load duration. At this third stage, the third initial load which is equal to the third final load is set to be equal to the second final load. In this embodiment, the third load duration is set to be 1142 minutes.

The fourth compression stage of the multi-stage operation starts right after the completion of the third load duration and will last as long as a fourth load duration. In the fourth compression stage, the output load of the hammer 12 is reduced gradually from a fourth initial load, that is equal to the third final load of 80 kg, to a fourth final load of 15 kg, which implies that the fourth final pressure is 150 $g/cm^2$. In addition, the fourth load duration is set to be 7 minutes.

The fifth compression stage of the multi-stage operation starts right after the completion of the fourth load duration and will last as long as a fifth load duration. In the fifth compression stage, the output load of the hammer 12 is maintained at the fourth final load for a period of the fifth load duration. At this fifth stage, the fifth initial load which is equal to the fifth final load is set to be equal to the fourth final load. In this embodiment, the fifth load duration is set to be 180 minutes. It is noted that the maximum pressure in this multi-stage operation is 800 $g/cm^2$.

At step S6, a multi-stage heating process composed of a plurality of heating/cooling stages is set up; and then the process flow chart proceeds to step S7. The heating/cooling stages of a multi-stage heating process are featured respectively by their distinctive initial temperatures, heating/cooling rates, final temperatures and constant heating durations of final temperatures. Operationally, the temperature controller 5 controls the heating unit 3 for enabling the furnace 30 to perform the multi-stage heating process upon the cell 7, whereas the multi-stage heating process is enabled simultaneously with the multi-stage compression process. The final temperature of a previous heating/cooling stage is commonly used as the initial temperature of the following heating/cooling stage.

In the first heating/cooling stage of the multi-stage heating process, the temperature is raised from a room temperature, i.e. a first initial temperature, to a first final temperature by a first heating rate while maintaining the first final temperature for a time period of a first constant heating duration. In this embodiment, the first heating rate is set to be 2.6° C./min, the first final temperature is set to be 250° C., and the first constant heating duration is set to be 0.3 hr.

In the second heating/cooling stage of the multi-stage heating process, the temperature is raised from a second initial temperature, i.e. the first final temperature, to a second final temperature by a second heating rate while maintaining the second final temperature for a time period of a second constant heating duration. In this embodiment, the second heating rate is set to be 2.2° C./min, the second final temperature is set to be 600° C., and the second constant heating duration is set to be 0.3 hr.

In the third heating/cooling stage of the multi-stage heating process, the temperature is raised from a third initial temperature, i.e. the second final temperature, to a third final temperature by a third heating rate while maintaining the third final temperature for a time period of a third constant heating duration. In this embodiment, the third heating rate is set to be 1.7° C./min, the third final temperature is set to be 770° C., and the third constant heating duration is set to be 0.3 hr.

In the fourth heating/cooling stage of the multi-stage heating process, the temperature is raised from a fourth initial temperature, i.e. the third final temperature, to a fourth final temperature by a fourth heating rate while maintaining the fourth final temperature for a time period of a fourth constant heating duration. In this embodiment, the fourth heating rate is set to be 1.2° C./min, the fourth final temperature is set to be 850° C., and the second constant heating duration is set to be 4 hr.

In the fifth heating/cooling stage of the multi-stage heating process, the temperature is reduced from a fifth initial temperature, i.e. the fourth final temperature, to a fifth final temperature by a first cooling rate while maintaining the fifth final temperature for a time period of a fifth constant heating duration. In this embodiment, the first cooling rate is set to be 1.2° C./min, the fifth final temperature is set to be 700° C., and the s fifth constant heating duration is set to be 0.3 hr.

In the sixth heating/cooling stage of the multi-stage heating process, the temperature is reduced from a sixth initial temperature, i.e. the fifth final temperature, to a sixth final temperature by a second cooling rate. In this embodiment, the second cooling rate is set to be 1.8° C./min, the sixth final temperature is set to be 350° C., and the sixth constant heating duration is set to be 0. hr.

In the seventh heating/cooling stage of the multi-stage heating process, the temperature is reduced from a seventh initial temperature, i.e. the sixth final temperature, to a seventh final temperature by a third cooling rate. In this embodiment, the third cooling rate is set to be 1.8° C./min, the seventh final temperature is set to be 40° C., and the seventh constant heating duration is set to be 0. hr.

At step S7, the multi-stage compression process and the multi-stage heating process is enabled to perform upon the cell; and then the process flow chart proceeds to step S8. That is, the temperature controller 5 is enabled to control the furnace 30 of the heating unit 3 to perform the multi-stage heating process upon the cell 7 according to the parameter setting defined in the step S6, and simultaneously the pressure controller 6 is enabled to control the compression system 1 to perform the multi-stage compression process upon the cell 7 according to the parameter setting defined in the step S5.

At step S8, after a period of time when the temperature of the furnace 30 is reduced to room temperature, the temperature controller 5 stop the heating of the heating unit 3 and the pressure controller 6 stops the activation of the compression system 1, the door 301 is opened for removing the cell 7, and then the steps S1 to S3 is repeated upon the cell 7. It is noted that all the parameters in each and every stage of the multi-stage compression process as well as in each and every stage of the multi-stage heating process can be set and adjusted according to actual requirement and thus will not be restricted by the aforesaid embodiments.

Figure 3:
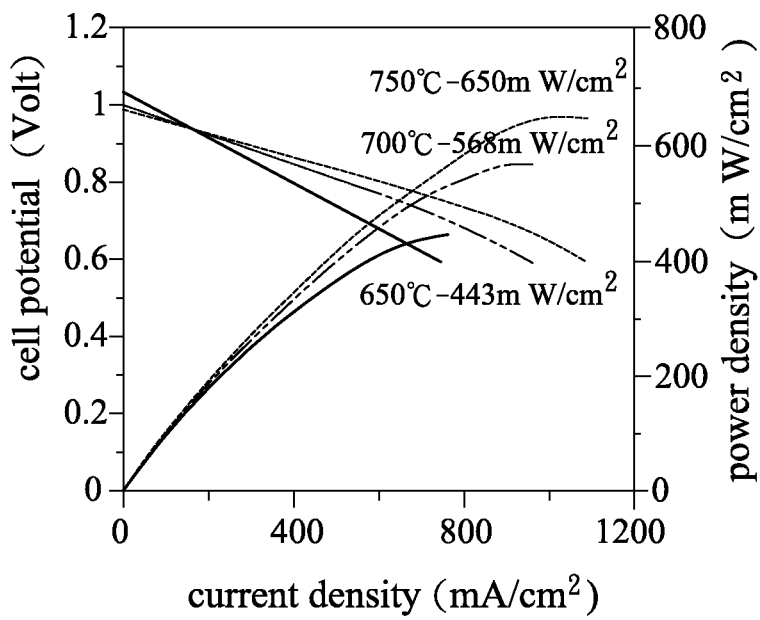
FIG. 3 is a curve chart depicting the relationship among cell current, cell potential and cell power that are measured from a solid oxide fuel cell of the present invention.

Taking a 10×10 cm$^2$ cell 7 for example, after being treated by the method and the apparatus of the present invention, the radius of curvature of the cell is increased by 2.6 times and the surface resistance of the cathode current collecting layer of the cell is reduced by 200 times. In addition, the cell 7 also passes the alcohol permeating test, as described in step S3. Please refer to FIG. 3, which is a curve chart depicting the relationship between cell current, cell potential and cell power that are measured from a solid oxide fuel cell treated by the present invention. As shown in FIG. 3, the open-circuit voltages (OCV) of the cell 7 at 650° C., 700° C. and 750° C. are larger than or close to 1V, this indicates that there is no significant crack existed in the electrolyte of the cell 7. The maximum power densities of the cell 7 are 650 mW/cm$^2$, 568 mW/cm$^2$ and 443 mW/cm$^2$ at 650° C., 700° C. and 750° C. respectively. Moreover, a long term durability test at 700° C. temperature and 400 mA/cm$^2$ constant current density is performed on the cell 7. During this test, the three thermal cycles that have a temperature profile of 700° C.—room temperature—700° C. with a heating/cooling rate of 1° C./min are executed. The result shows that the average decay of the cell 7 is about 0.8% for every 1000 hours. Thus, the treated cell 7 has inspiring electric properties. In the present invention, the porous metal substrate for supporting the cell 7 is made from Ni and Fe elements, whereas all SOFC function layers are coated thereon by a means of air plasma spray (APS), and the material structure of cell 7 is given as Ni/Fe-LSCM-LDC/NiO-LDC-LSGM-LSGM/SSC-SSC.

Figure 4:
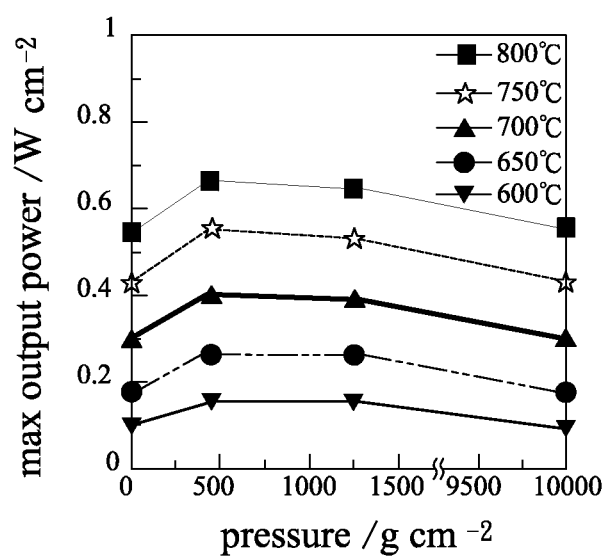
FIG. 4 is a curve chart depicting the relationship between the maximum output power and pressure in a solid oxide fuel cell of the present invention.
Figure 5:
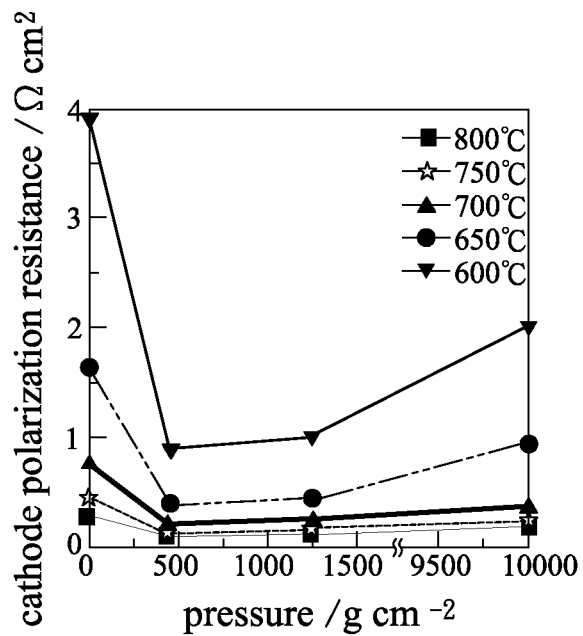
FIG. 5 is a curve chart depicting the relationship between the cathode polarization resistance and pressure in a solid oxide fuel cell of the present invention.
Figure 6:
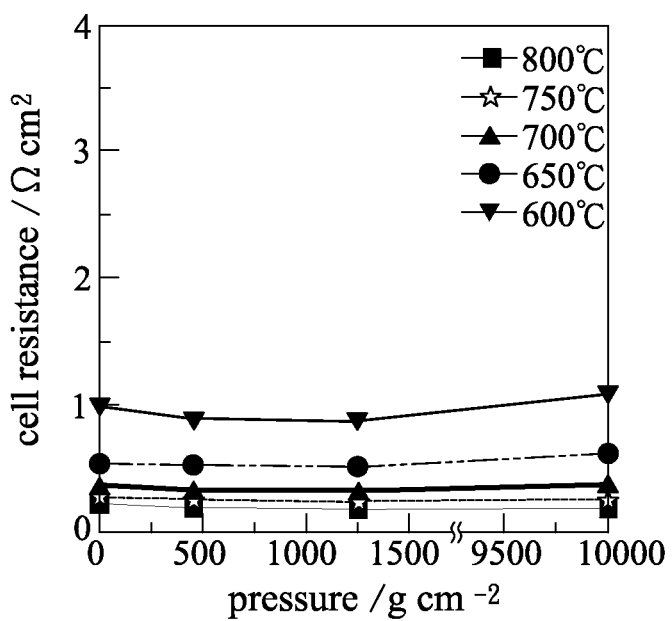
FIG. 6 is a curve chart depicting the relationship between the cell resistance and pressure in a solid oxide fuel cell of the present invention.

In another embodiment where a circular cell of 24 mm in diameter is used and treated by the method and the apparatus of the present invention with a pressure varied from 450 g/cm$^2$ to 10000 g/cm$^2$ in step 5, the power, the cathode polarization resistance and the cell resistance of this tested cell versus pressures at temperatures from 600° C. to 800° C. are shown in FIG. 4, FIG. 5 and FIG. 6. It is noted that the cell that is treated by the present invention at 450 g/cm$^2$ has the maximum power output, the minimum cathode polarization resistance and the minimum cell resistance (including ohmic resistance, electrode polarization resistance, electrolyte ohmic resistance and contact resistance) This circular cell has also a porous metal substrate made from Ni and Fe elements, whereas all SOFC function layers are coated thereon by a means of air plasma spray (APS), and the material structure of this cell is the same as the cell 7.

In addition, the treating method and the apparatus of the present invention not only can be applied to the metal supported planar solid oxide fuel cell, but also can be applied to other types of planar solid oxide fuel cells.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An apparatus for treating solid oxide fuel cells, comprising:
   a pressure source;
   a compression system, coupled to the pressure source;
   a heating unit;
   a pressure transmission unit, coupled to the compression system and transmitting a pressure to a solid oxide fuel cell, comprising:
   a ceramic tube;
   a cushion module, disposed within said furnace, comprising:
     a ceramic plate, disposed beneath said ceramic tube;
     a ceramic blanket, disposed beneath said ceramic plate; and
     a ceramic cloth, disposed beneath said ceramic blanket and above said solid oxide fuel cell;
   a metal supporting plate, disposed beneath said solid oxide fuel cell within said furnace; and
   a ceramic supporting brick set, disposed beneath said metal supporting plate on the bottom of said furnace;
   a temperature controller, coupled to the heating unit, programmed to perform a multi-stage heating process; and
   a pressure controller, coupled to the compression system, programmed to perform a multi-stage compression process, wherein said multi-stage heating process is performed simultaneously with said multi-stage compression process.

2. The treatment apparatus of claim 1, wherein the pressure source comprises:
   an air compressor; and
   a pressure gauge, coupled to the air compressor.

3. The treatment apparatus of claim 2, wherein the pressure source comprises a moisture separator coupled to the pressure gauge.

4. The treatment apparatus of claim 1, wherein the compression system comprises:
   a pneumatic cylinder;
   a pressure regulator, coupled respectively to the pneumatic cylinder and a moisture separator; and
   a hammer, coupled to the pneumatic cylinder.

5. The treatment apparatus of claim 4, wherein the hammer is a taper head hammer.

6. The treatment apparatus of claim 4, wherein the compression system further comprises:
   a support, the pressure regulator and the pneumatic cylinder mounted on the support, and the hammer is arranged to be movable through the support.

7. The treatment apparatus of claim 1, wherein the heating unit further comprises a furnace.

8. The treatment apparatus of claim 7, wherein the furnace has a door that is disposed at the top thereof while allowing the support arranged to surround the door, and the door is further formed with a hole.

9. The treatment apparatus of claim 1, wherein the ceramic tube is disposed passing through the door and extending inside a furnace to be engaged with the cushion module.

10. The treatment apparatus of claim 1, wherein the ceramic tube is substantially a ceramic aluminum oxide tube.

11. The treatment apparatus of claim 1, wherein the ceramic plate is substantially a solid aluminum oxide plate, the ceramic blanket comprises more than 50% alumina fiber, and the ceramic cloth comprises more than 50% alumina fiber.

12. The treatment apparatus of claim 1, wherein the metal supporting plate is designed with an expansion coefficient that is about the same as an expansion coefficient of an electrolyte of the solid oxide fuel cell.

13. The treatment apparatus of claim 12, wherein the metal supporting plate comprises Crofer 22 ferritic stainless steel and has a thickness of 5~6 mm.

* * * * *